United States Patent [19]

Mausgrover

[11] 4,246,112
[45] Jan. 20, 1981

[54] OIL-WATER SEPARATOR HAVING MEANS FOR CONDITIONING THE WATER FOR REUSE

[75] Inventor: Robert H. Mausgrover, Harrisburg, N.C.

[73] Assignee: Ultracept, Inc., Charlotte, N.C.

[21] Appl. No.: 89,966

[22] Filed: Oct. 31, 1979

Related U.S. Application Data

[63] Continuation-in-part of Ser. No. 60,655, Jul. 25, 1979.

[51] Int. Cl.³ .............................................. B03D 3/00
[52] U.S. Cl. .................................... 210/104; 210/114; 210/258; 210/540
[58] Field of Search .................. 210/83, 84, 104, 114, 210/115, 124, 167, 258, 540

[56] References Cited

U.S. PATENT DOCUMENTS

| 2,782,929 | 2/1957 | Colket | 210/540 X |
|---|---|---|---|
| 2,879,894 | 3/1959 | Nelson | 210/540 X |
| 3,862,039 | 1/1975 | Summers | 210/540 X |
| 3,862,040 | 1/1975 | Preus | 210/540 X |
| 3,907,682 | 9/1975 | Basseet | 210/114 |
| 3,996,136 | 12/1976 | Jakubek | 210/114 |
| 4,132,645 | 1/1979 | Bottomley | 210/540 X |

Primary Examiner—John Adee
Attorney, Agent, or Firm—Bell, Seltzer, Park & Gibson

[57] ABSTRACT

Waste water, in the form of an oil-water mixture, is passed through a series of successive processing stages for effectively separating the water from the oil and directing the same into respective storage compartments. The separated water is conditioned in its storage compartment for reuse by providing a circulating pump therein for circulating and agitating the separated water and thereby aerating the same to prevent stagnation and freezing of the stored separated water. Further, an additional pump is provided in the water storage compartment for directing the separated water from the storage compartment to a desired location for reuse. The separated water may be heated selectively as it is directed away from the water storage compartment, and fresh water also may be introduced into the water storage compartment if the separated water therein drops to a predetermined lower level.

11 Claims, 3 Drawing Figures

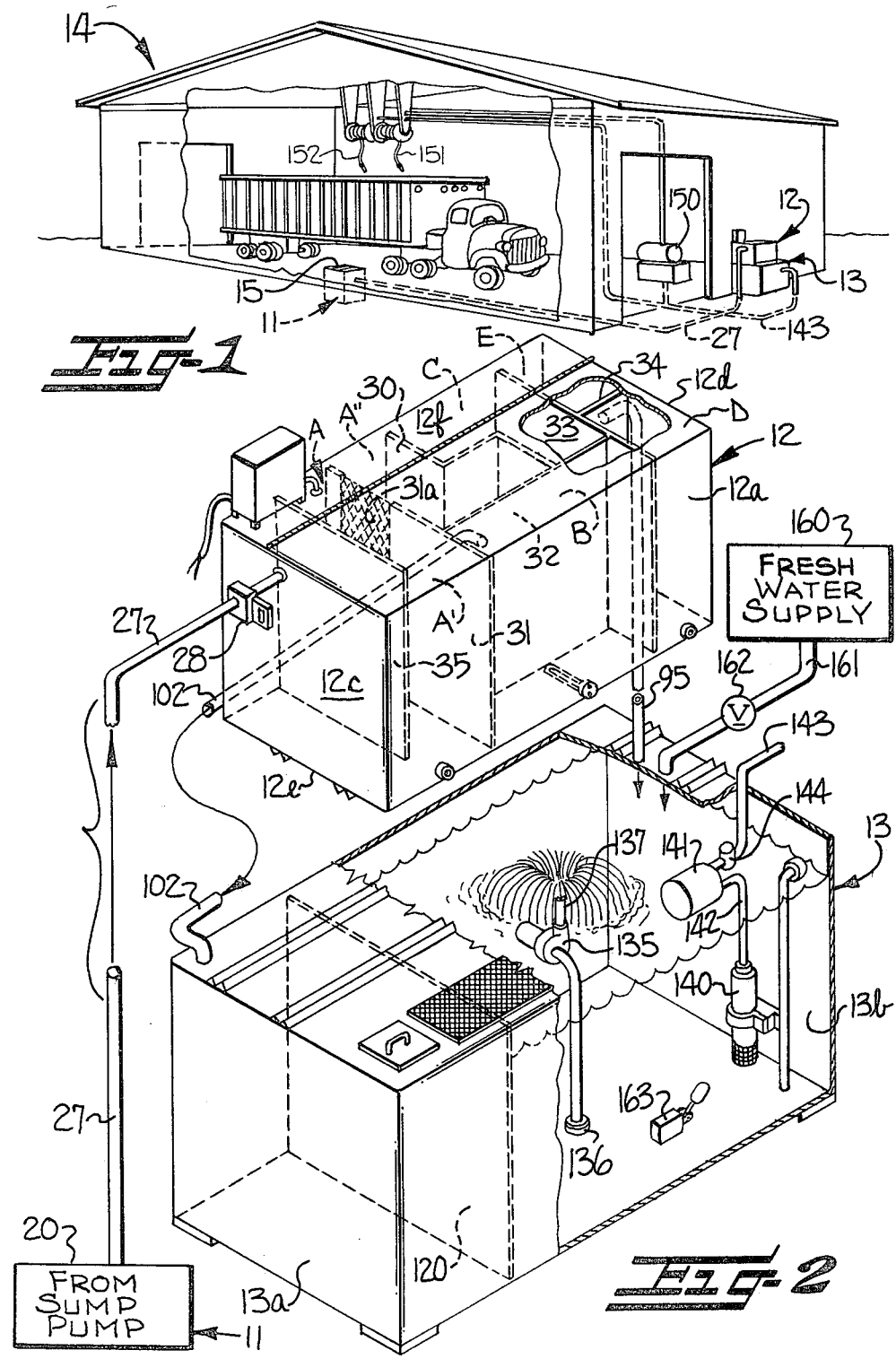

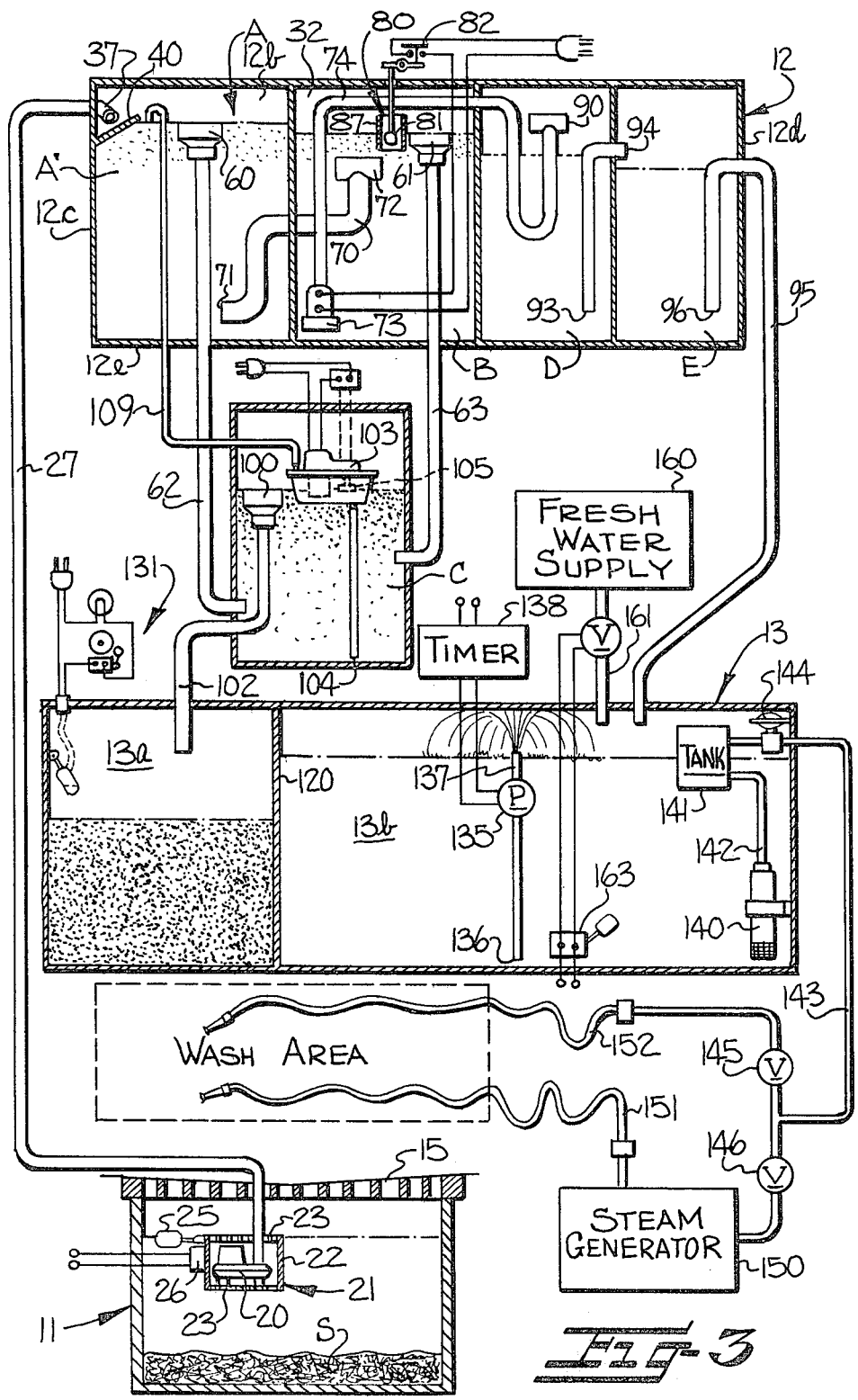

OIL-WATER SEPARATOR HAVING MEANS FOR CONDITIONING THE WATER FOR REUSE

CROSS-REFERENCE TO RELATED APPLICATION

This application is a continuation-in-part of my copending application Ser. No. 60,655, filed July 25, 1979, and entitled APPARATUS AND METHOD FOR REMOVING OIL CONTAMINANTS FROM WASTE WATER.

FIELD AND SUMMARY OF THE INVENTION

This invention relates to improvements in an apparatus for separating and removing oil, grease and similar contaminants from waste water, such as is discharged incidental to industrial cleaning operations, and particularly pertains to an improvement in an oil-water separator of the type described and claimed in my said copending parent application. More specifically, this invention is concerned with an apparatus for separating and removing oil from waste water, which apparatus facilitates reuse of the separated water at desired locations and also conditions the water for such reuse.

The oil-water separator disclosed and claimed in my said copending parent application is adapted to receive oil-containing waste water produced incidentally to the washing down and cleaning of trucks and/or other vehicles. The oil-water mixture is passed through successive processing stages which effectively separate the water from the oil and direct the same into respective storage compartments. Generally, the separated oil can be used for various purposes, such as a low-grade lubricant, a dust-inhibiting film for unpaved roads, etc. The separated water generally is sufficiently cleaned and free of oil particles therein so that it can be reused for a variety of purposes, such as for washing down trucks and/or other vehicles, watering vegetation, and the like.

There are some instances in which it is desirable or convenient to store the separated water over considerable periods of time, such as days, weeks or even months, without removing any of the separated water from its storage compartment. Consequently, the separated water might become undesirably stagnant or it might freeze. On the other hand, there are other instances in which the amount of separated water available in the storage compartment may not suffice for a particular purpose.

With the foregoing in mind, it is a general object of this invention to provide an improved oil-water separator of the type described which processes and conditions the separated water so as to make it available for a wide variety of uses.

It is another object of this invention to provide an oil-water separator of the type disclosed in my said copending parent application with means for preventing stagnation and freezing of the separated water within the water storage compartment, and with additional means for directing the separated water from the storage compartment for reuse.

It is a more specific object of this invention to provide an oil-water separator of the type described wherein the means for preventing stagnation and freezing of the separated water includes means, such as a pump, within the water storage compartment of the oil-water separator for aerating the separated water by circulation and agitation of the water. By conditioning the separated water in this manner, it can be appreciated that stagnation and freezing of the separated water is prevented and the water is thus further made readily available for a wide variety of uses.

In accordance with the invention, to further facilitate reuse of the separated water, there is provided means, such as an additional pump, within the water storage compartment for directing the water therefrom to the desired location for such reuse. Optionally, if desired, the separated water also may be heated as the water is being directed away from the water storage compartment. Further, a fresh water supply may also be included so that fresh water can be introduced into the water storage compartment in the event of the level of the water therein dropping to a predetermined minimum or low level.

BRIEF DESCRIPTION OF THE DRAWINGS

Some of the objects and advantages of the invention having been stated, others will appear as the description proceeds, when taken in connection with the accompanying drawings, in which FIG. 1 is an environmental view of an oil-water separator embodying the features of the present invention;

FIG. 2 is a partially exploded perspective view of the oil-water separator's main housing and auxiliary housing as shown in FIG. 1; and FIG. 3 is a schematic diagram of the oil-water separator illustrating the sequence in which the waste water flows through the separator.

DESCRIPTION OF THE ILLUSTRATED EMBODIMENT

Referring more specifically to the drawings, the oil-water separator is indicated generally at 10 and includes many of the elements and features of the oil-water separator disclosed in my said copending parent application. Thus, there is provided a sump 11 from which waste water containing oil and other similar lighter-than-water contaminants is conveyed to a main separator housing 12 as will be later described. The main housing 12 is positioned upon an auxiliary housing or storage reservoir means 13 which defines two tanks or compartments 13a, 13b for respectively receiving therein separated oil and water for storage after the waste water has been processed through the main separator housing 12. In accordance with this invention, the separated water within the water storage compartment 13b is conditioned in a manner to be later described so that the water can be reused. In a typical arrangement, such as is illustrated in FIG. 1, the sump 11 is positioned within and below the floor of a motor vehicle service facility 14 so as to receive waste water from the floor of the service facility and from the trucks and/or other vehicles being washed down or otherwise serviced. However, as preferred, the main separator housing 12 and the storage reservoir means 13 are placed in a remote location such as outside the service facility 14. From the storage reservoir means 13, the processed water is directed to an area wherein the water is reused, and as shown in FIG. 1, this area may be located in the vicinity of the sump 11 so that the water may again enter the sump as waste water and be recycled through the oil-water separator.

As indicated above, the sump 11 is adapted to receive waste water as it runs off the trucks or other vehicles or objects being cleaned. As shown in FIG. 3, the sump 11 is provided with top wall means in the form of a grate 15 which may be a part of the floor of the facility 14. Thus, the waste water runs off the vehicles or objects being cleaned and flows through the grate 15 into the sump 11 as the grate prevents undesirably large objects from dropping into the sump. During the time that the waste water is being retained in the sump 11, it is apparent that heavier-than-water precipitates tend to gravitate and separate from the waste water and are deposited to accumulate upon the bottom or floor of the sump 11 as sludge S for subsequent removal thereof. Also, the oil which mixes with the water as it flows into the sump 11 begins to separate from the waste water and float to the surface thereof.

Associated with the sump 11 is waste water discharge means comprising a sump pump 20 for removing the waste water from the sump. The pump 20 is mounted within the sump 11 in such a manner as to remove the waste water from a location below the surface of the water so that both separated oil and water will be discharged from the sump. Also, pump 20 is so located as to avoid disturbing the sludge S deposited at the bottom of the sump. To this end, there is provided an open-ended basin 21 in which the pump 20 is positioned and which is mounted to one side wall of the pump 11 and substantially above the bottom of the sump so that minimal quantities of the sludge are drawn into the pump. The basin 21 includes solid side walls 22, and grates 23 cover the top and bottom of the basin whereby the pump 20 is entirely enclosed within the basin 21 with the pump resting upon the lower grate 23. In operation, waste water is permitted to accumulate so that the level of the waste water will exceed the elevational position of the upper grate 23, and in this manner, the waste water will flow into the open space between the inner sides of the side walls 22 and the pump 20. Any oil that may gravitationally separate from the water while in the sump 11 is thereby removed by being drawn down through the upper grate 23 into the pump 20 while water is drawn up through the lower grate 23 into the pump. The grates 23 of the basin 21 also prevent large objects from entering the pump and interfering with its operation.

A pump 20 is periodically actuated by waste water level sensing means, operably associated with the pump 20, and which causes the pump 20 to draw the waste water down to a predetermined relatively low level. The waste water level sensing means comprises a float 25 and an electrical switch 26 operably associated with the float. As the waste water level within the sump 11 rises, the float 25 rises therewith and operates the switch 26 in response to sensing a predetermined relatively high level of the water. Upon sensing such a predetermined high level, the float 25 causes switch 26 to close an electrical circuit to the pump 20 so the pump 20 then discharges the waste water until the level thereof returns to the predetermined low level. The float 25 drops with the level of the waste water so that the switch 26 is opened to stop operation of the pump when the predetermined low level is reached. In this manner, the waste water is discharged from the sump 11 only after a certain volume has accumulated therein.

From the sump 11, the waste water is directed to the main housing 12 wherein the oil gravitationally separates from the waste water and is removed from the upper surface of the water. Within the main housing 12 are a series of compartments A-E in which the waste water is processed and through which the waste water sequentially flows as best illustrated in FIG. 3. As shown, various walls and partitions provided in the main housing 12 define the compartments A-E, as will be later described in more detail. It should be noted, however, that although intermediate partitions to be later described are shown in the compartment A in FIG. 2, these intermediate partitions do not block or interrupt direct fluid communication between the various sections of the compartment A. Therefore, the reference character A defines a single composite settling and separation compartment which is divided into a waste water settling compartment A' and a first oil-water separation compartment A" which are in continuous communication with each other. The sump pump 20 propels the waste water from sump 11 to the main housing 12 through a conduit 27 interconnecting the outlet of the pump in the main housing 12. To control the rate at which waste water is admitted into the main housing 12, a manually adjustable flow control valve 28 is interposed in the conduit 27 between the pump 20 and the main housing 12.

The main housing 12 of the oil-water separator 10 is of substantially rectangular shape and includes front and rear side walls 12a, 12b, opposite end walls 12c, 12d, a bottom wall 12e and a top wall 12f. Cooperating with the walls of the housing 12 to define the compartments A-E are partitions 30-34, all of which extend substantially vertically from the bottom wall 12e to the top wall 12f of the housing. It will be observed that a portion of partition 31 extends rearwardly from partition 32 into compartment A for defining the juncture between the waste water settling compartment A' and the first oil-water separation compartment A". Partition 31 is provided with a relatively large filter or screened opening 31a which is adjacent the upper portion of the partition 31 and through which the waste water may readily pass. Also, the water settling compartment A' contains another intermediate partition or dividing wall 35 which is spaced about midway between the left-hand end wall 12c of the housing and the partition 31. The intermediate partition 35 extends vertically from the bottom wall 12e to the top wall 12f of the housing and extends forwardly from the rear wall 12b to a point about ¾ the distance to the front wall 12a. Thus, there is provided a substantial opening or passage for flow of the waste water between the front edge of the partition 35 and the front wall 12a of the housing.

The waste water is initially directed into the waste water settling compartment A' of the composite water settling and separation compartment A within the main housing 12, wherein the agitation and motion of the waste water is reduced so that the oil will begin to separate from the water. To enhance separation of the oil and water, the agitation and motion of the waste water is reduced by various means. First, the waste water is admitted into the settling compartment A' through a T-shaped pipe fitting or section of conduit 37 communicatively connected to the conduit 27 from the pump 20 within the sump 11. The T-shaped section 37 directs the waste water laterally outwardly above the level of the water in compartment A' while thereby diffusing the flow of the water and minimizing the forming of currents in the water in the compartment A'. The T-shaped section 37 is positioned above the operating level of the waste water within the settling compartment A' so as to discharge the waste water upon a cascade plate or tray 40 projecting inwardly from housing rear wall 12b.

Thus, the waste water must flow over the cascade tray 40 and down into the inlet end portion or section of settling compartment A' thereby providing further diffusion of the water. The waste water is also admitted to the settling compartment A' in the rear corner thereof and gravitationally flows forwardly between wall 12c and the partition or dividing wall 35. The partition 35 serves to increase the residence time of the waste water within the inlet end portion of settling compartment A' since the waste water is caused to flow around one end of the partition 35. The dividing wall or partition 35 thus causes the waste water to flow in a somewhat serpentine path to increase the time that the water is present in the settling compartment A'.

The waste water flows from the settling compartment A' through the filter or screened opening 31a, which is located in the upper portion of the partition 31 so that the partially separated oil and water will not become intermixed as it flows into the first oil-water separation compartment A" and so that any sludge or sediment which has been deposited on the bottom of the settling compartment will not be transferred therefrom. Thus, the opening 31a extends downwardly from above the surface of the waste water to a level approximately midway of the height of the composite compartment A. The filter or screen is provided at the opening 31a to prevent floating objects of a larger size than the oil particles, such as scraps of paper and the like, from passing out of the settling compartment A'.

In the first oil-water separation compartment A", further gravitational separation of the oil from the water takes place and most of the oil is removed from the surface of the water and directed to the compartment C. Thus, compartment C may be termed as an "oil collection compartment". The water in the first oil-water separation compartment A" is directed to compartment B which may be termed a "second oil-water separation compartment" and which effects further gravitational separation of the oil and water and removal of the oil from the surface of the water. The oil removed in the second separation compartment B is also directed into the oil collection compartment C, and the water is directed from the second separation compartment B into the compartment D, which thus may be termed as a "water collection compartment".

To remove the oil and other similar lighter-than-water contaminants from the surface of the water in the first and second oil-water separation compartments A" and B, first and second drains 60, 61 are positioned respectively within the first and second compartments A", B. The drains 60, 61 are communicatively connected to the oil collection compartment C by respective conduits 62, 63 so as to direct separated oil into the oil collection compartment C by gravity. As shown in the illustration of drain 60 in FIG. 3, the drains 60, 61 (which may be identical) are generally funnel-shaped and have respective upwardly open months. Additionally, each drain 60, 61 is frictionally slideably mounted on its respective conduit 62, 63 so as to be vertically adjustable thereon.

The mouths of the drains 60, 61 are positioned at relatively different levels or heights with respect to each other to aid in obtaining an accumulation of a substantial layer of oil at the upper surface of the waste water in the first oil-water separation compartment A" and so that the oil will not flow into the drain 60 until a layer of separated oil of predetermined minimum thickness or depth is floating on the surface of the water, whereupon the layer of oil, virtually free of any water mixed therewith, will flow into the drain 60. Accordingly, the mouth of the drain 61 in the second oil-water separation compartment B is located below the level of the mouth of the drain 60 in the first separation compartment A", and drain 61 is positioned so as to be at the same level as the surface of the water when the second separation compartment B is substantially filled. On the other hand, the mouth of the drain 60 in the first oil-water separation compartment A" is positioned so as to be adjacent but above the surface of the water when said compartment is substantially filled with water for removing separated oil floating on the surface of the water therein.

It is important that the drain 61 in the second oil-water separation compartment is positioned below drain 60 so that whenever the level of the waste water in the second separation compartment B reaches the level of the mouth of drain 61, the level of the body of the waste water in the first separation compartment A" will be below the level of the mouth of drain 60. In other words, if the second separation compartment B is substantially filled with waste water, to the extent that the waste water overflows or is skimmed into the drain 61 and thus flows into the oil collection compartment C, the level of the waste water in the first separation compartment A" will reach a maximum height somewhat less than that of the mouth of drain 60. In practice it has been found that the difference between the maximum height of the water level in the first separation compartment and the mouth of the drain 60 associated therewith should be in the range of about ⅛ inch (3.18 mm) to about ¼ inch (6.35 mm).

As will be later described, means are provided for restricting the flow of waste water from the first oil-water separation compartment A" into the second separation compartment so as to effect an increased residence time or dwell time for the waste water in the first separation compartment A" to increase the time during which the oil in the mass of the waste water present in the first compartment A" may migrate or rise to the surface of the waste water. The restricting of the flow of waste water from compartment A" into compartment B causes the waste water to flow into second compartment B at a slower rate than that at which the waste water is normally admitted into the first compartment A", thus causing the water to back up in the first compartment A" and thus present a higher water level in the first compartment than that in the second compartment. The maximum height of the surface of the water upon which the separated oil floats in the first separation compartment should never be any higher than about ⅛ to ¼ inch (3.18 to 6.35 mm) below the mouth of drain 60 therein. It follows that the layer of oil floating on the surface of the water in the first separation compartment A" will have a minimum thickness of about ⅛ to ¼ inch (3.18 to 6.35 mm) before flowing into the mouth of the drain 60. In an actual apparatus constructed in accordance with this invention it was determined that the water level in the first compartment was about one inch (25.4 mm) higher than the water level in the second compartment due to the restriction flow therebetween, with the mouth of the drain 60 in the first oil-water separation compartment A" being positioned approximately 1¼ inches (31.75 mm) above the level of the mouth of the drain 61 in the second oil-water separation compartment B.

With the foregoing description of the compartments A", B and drains 60, 61 in mind, it is to be noted that oil will accumulate on the surface of the water in the first separation compartment A" until a layer or head of oil of predetermined minimum thickness or depth is built up on the surface of the water to the level of the mouth of drain 60, whereupon the oil will flow into the drain 60. The cohesion of the oil particles and the capillary action at the mouth of the drain 60 will cause the oil to continue to flow into the drain 60 until a substantial portion of the layer of oil is removed. Thereupon, the flow of oil into drain 60 ceases until another layer of oil of predetermined thickness accumulates on the water. In the use of the actual apparatus mentioned above, a layer of oil of approximately ¼ inch (6.35 mm) thickness accumulated on the surface of the water in the first separation compartment in approximately three to four hours of operation. Thus, actual removal of the oil from the surface of the water by draining into drain 60 occurred for a brief interval once in about every three to four hours. The rate at which the oil accumulated, however, depended upon the concentration of oil in the waste water and the amount of waste water admitted to the main housing 12. Thus, the frequency at which the oil was removed varied accordingly.

The restricted flow of waste water from the first separation compartment A" to the second separation compartment B is effected through a conduit 70 communicatively interconnecting the separation compartments A", B in such a manner that water substantially free of oil is directed into the second separation compartment B. To this end, conduit 70 has an inlet end 71 which is positioned adjacent the bottom portion of the first separation compartment A". Thus, predominantly water, with minimal emulsified oil mixed therewith, enters the conduit inlet end 71, since the oil and water will have substantially separated within the lower, downstream portion of the first separation compartment A". The outlet end 72 of conduit 70 is T-shaped to direct the waste water laterally outwardly so as to minimize agitation of the waste water and intermixing of the oil and water. The outlet end 72 is positioned closely adjacent and below the surface of the water in the second separation compartment B as shown in FIG. 3 so that any oil particles therein are near the surface of the water, thus reducing the time which may be required for the oil particles to rise to the surface of the water in compartment B. It follows that discharge of the waste water closely adjacent the surface aids in reducing the amount of oil intermixed with the water when directed from the second separation compartment B.

While in the second separation compartment B, the waste water undergoes further gravitational separation, and the oil at the surface of the water is periodically removed by being skimmed into drain 61 while the water in the second separation compartment B is periodically discharged into the water collection compartment D. By periodically or discontinuously discharging the water from the second separation compartment B, rather than continuously removing the water, as by a continuous gravitational flow, the residence or dwell time of the waste water within the second separation compartment B is increased, thereby providing additional time for separation of the emulsified oil from the water. Thus, water discharge means comprising a pump 73 is associated with the second separation compartment B to discontinuously remove the water therefrom. The pump 73 is positioned within the second separation compartment B and has an inlet distally positioned relative to the outlet end 72 of the conduit 70, and preferably located well below the level of the mouth of the drain 61 and within the lower portion of the second separation compartment B. The inlet of the water discharge means or pump 73 is distally positioned with respect to the outlet end 72 of conduit 70 to aid in minimizing the introduction of water, which may contain some emulsified oil, from the outlet end 72 of the conduit into the inlet of pump 73 until some time has elapsed for the separation of the oil and water in compartment B. Thus, the pump 73 discharges the relatively clean water from the lower portion of the second separation compartment B into the water collection compartment D via a conduit 74.

To effect discontinuous or periodic operation of pump 73, so as to discontinuously or periodically discharge water from the second separation compartment B, water level sensing means 80 is operably associated with the pump 73 for periodically actuating the pump 73 in response to the level of the water within the second separation compartment B. The water level sensing means 80 senses the height of the water in the second separation compartment B rising to the height of the mouth of the drain 61 with a small amount of oil and water thus being skimmed into the drain 61 and then actuates the pump 73 thus causing the pump to draw the water down to a predetermined lower level, for example, about 1¾ to 2 inches (44.45 to 50.8 mm) below the mouth of the drain 61. More specifically, the water level sensing means 80 comprises a float 81 which moves vertically in response to the level of the water in the second separation compartment B and which actuates a switch 82 that opens and closes a circuit connecting the pump 73 to a power source, not shown.

By removing the water from the second separation compartment B in this discontinuous manner, emulsified oil passing into the second separation compartment B is afforded an additional period of time to separate from the water and rise to the surface of the water for removal by flowing into the drain 61. However, since most of the oil is accumulated in the first separation compartment A" and removed at that location, only minute quantities of oil are removed in the second separation compartment B. Thus, although residual amounts of water are removed with the oil in the second separation compartment B, the additional residence period of time for separation increases the amount of oil with respect to the water that is removed.

Since it is desirable to discharge only substantially oil-free water from the second separation compartment B, into the water collection compartment D, precise operation of the pump 73 in response to the level of the water in the second separation compartment is highly desirable. Thus, a protective member or shield 87 comprising a section of pipe mounted to the partition 32, may be provided which surrounds the float 81 so that agitation of the water will not prematurely activate or deactivate the switch 82. The protective member 87 also prevents oil from accumulating around the float 81 and interfering with proper operation of the water level sensing means 80.

As indicated above, the water is discharged from the second separation compartment B, into water collection compartment D where further separation of residual oil, if any is present, takes place. Thus, the pump 73 discharges the water through conduit 74 into the water collection compartment D and through the conduit's outlet end 90, which may be T-shaped to aid in minimizing agitation of the water within the water collection compartment D. Also, the portion of the conduit 74 within the water collection compartment D may be U-shaped to form a trap for the water and prevent entrance of air into conduit 74, as well as to aid in minimizing agitation of the effluent.

From the water collection compartment D, the water is discharged into compartment E, which may be termed as a "water inspection compartment", wherein samples of the water may be taken to determine the amount of oil, if any, remaining in the water. Compartment E also permits further settling of the water if necessary. To discharge the water from the water collection compartment D into compartment E, a conduit 92 is positioned within the water collection compartment D so that water will gravitationally flow into the water inspection compartment E. Thus, the inlet end 93 of the conduit 92 is positioned within the lower portion of the water collection compartment D, and the outlet end 94 discharges the water into the water inspection compartment E at a position within the upper portion of the inspection compartment. At that point, samples of the water may be taken. From the water inspection compartment E, the water is discharged through a conduit 95 having an inlet end 96 within the lower portion of the inspection compartment. Conduit 95 passes through the end wall 12d of main housing 12 at a point above the midportion of the wall 12d. Thus, water is allowed to collect within inspection compartment E before the water is gravitationally discharged therefrom.

Referring to the oil collection compartment C, it is noted that the oil collection compartment C is adapted to receive separated oil from the first and second oil-water separation compartments A", B so that any remaining residual water intermixed with the oil can separate prior to removal of the oil from the oil collection compartment C. Thus, there is provided means associated with the oil collection compartment C for removing the oil from the residual water and including a drain 100, having a mouth adapted to be located adjacent the surface of the oil which floats to the surface of the residual water. Thus, as the level of the oil within the oil collection compartment C rises, the oil flows into the drain 100 and is discharged from the oil collection compartment C through a conduit 102 passing through the rear side wall 12b.

The residual water which accumulates in the oil collection compartment C is discharged therefrom in a discontinuous manner so that adequate separation of the residual water from the oil is permitted. Water discharge means comprising a pump 103 is associated with the oil collection compartment C to remove the residual water therefrom, and the inlet 104 for the pump 103 is positioned closely adjacent the bottom of the oil collection compartment C so that substantially oil-free residual water will be discharged. There is also included level sensing means 105 operably associated with pump 103 for periodically actuating the pump in response to the level of the oil in the oil collection compartment C. When the height of the oil in the oil collection compartment C rises to the mouth of drain 100 and starts to flow therein, the level sensing means 105 actuates pump 103, causing the pump to draw the water down so as to obtain a predetermined lower level of the oil below the mouth of drain 100. In this manner, the residual water is removed from the separated oil and the oil discharged from the oil collection compartment C includes minimal intermixed water therewith.

The residual water discharged from oil collection compartment C is recycled to the waste water settling compartment A' for reprocessing through the oil-water separation compartments A", B to remove substantially all the oil from the water. To discharge the residual water in this manner, a conduit 109 connects the outlet of pump 103 to the settling compartment A'.

From the main housing 12, the separated water and oil are discharged to the auxiliary housing or storage reservoir means 13 wherein the oil is retained for final disposal and wherein the water is retained for subsequent reuse. The storage reservoir means 13 is constructed in a manner similar to the construction of the main housing 12 and includes a common partition wall 120 defining the oil tank or storage compartment 13a and the water tank or storage compartment 13b. In the illustrated embodiment, the partition wall 120 divides the storage reservoir means 13 so that the water storage compartment 13b has approximately twice the capacity of the oil storage compartment 13a. Under typical operating conditions, adequate capacity for the oil is thereby provided, and since little water is present in the separated oil, only occasional removal of the accumulated oil from the oil storage compartment 13a may be required.

The oil from the oil collection compartment C is discharged into the oil storage compartment 13a via the conduit 102 from the drain 100 in the oil collection compartment C which communicates with the top of the oil storage compartment. The oil in the oil storage compartment 13a is collected for disposal when a sufficient quantity is accumulated, and as illustrated schematically in FIG. 3, an oil level alarm 131 is associated with the oil storage compartment 13a to provide a signal when the amount of oil within the oil storage compartment approaches the capacity of the compartment 13a.

The water from the water inspection compartment E is discharged into the water storage or collection compartment 13b via the conduit 95, which communicates with the top of the water storage compartment, and the water is collected therein for reuse in the manner explained below.

To prevent stagnation and freezing of the water within the water storage compartment 13b during periods of infrequent operation, there is provided a water pump 135 which is positioned within the water storage compartment to circulate and aerate the water therein. The water pump 135 includes an inlet 136 adjacent the lower portion of the water storage compartment 13b and an outlet 137 which discharges the water upwardly above the level of the water within the water storage compartment. This upward discharge not only circulates the water within the water storage compartment 13b but also aerates the water as it is projected into the air space above the level of the water. A timer 138 is operably associated with the water pump 135 so that the pump may be activated and deactivated at predetermined intervals as would be required to prevent stagnation and freezing of the water.

The water in the water storage compartment 13b is directed therefrom to a desired location so that the water can be reused either in the same initial operation or for different purposes as may be desired. For this purpose, there is provided a submergible pump 140 positioned in the water storage compartment 13b and located so as to be submerged in the water in the water storage compartment. The pump 140 is positioned within the water storage compartment 13b so that the inlet of the pump is within the lower portion of the water storage compartment whereby the water is drawn from such lower portion so that additional protection is provided against the discharge of oil intermixed with water from the oil-water separator 10.

The submergible pump 140 directs the water to a pressure tank 141 positioned within the water storage compartment 13b so that a pressurized head of water can be obtained. The pressure tank 141 is interconnected with the submergible pump 140 by a conduit 142, and a conventional check or foot valve, not shown, is contained within the pump 140 so that the pressurized head of water can be retained within the pressure tank 141.

From the water storage compartment 13b, the water is directed to the desired location where it is reused, and for that purpose, there is provided a conduit 143 which leads from the pressure tank 141 and a pressure switch 144 which controls the operation of the submergible pump 140 so that sufficient water pressure can be provided to deliver a pressurized flow of water to a desired location for reuse. The pressure switch 144 is interposed in the conduit 143 leading from the pressure tank 141 and is operatively associated with the submergible pump 140 so as to control its operation in response to sensing the pressure within the conduit 143 and thus within the pressure tank 141. When the water pressure within the conduit 143 drops to a predetermined low level, the pressure switch 144 actuates the submergible pump 140 which in turn increases the water pressure within the pressure tank 141 and conduit 143. Upon sensing a predetermined higher water pressure level which is sufficient to deliver water to the desired location of reuse, the pressure switch 144 deactivates the submergible pump 140.

The pressurized water directed from the water storage compartment 13b may be selectively heated prior to being reused or reused without being heated. Thus, there are provided valves 145 and 146 which are connected to the conduit 143 leading from the pressure tank 141 and which selectively direct the water into a heating means 150 or which permit the water to bypass the heating means. By operating the valve 146 which is connected to the heating means 150, the desired amount of water can be admitted to the heating means where the water's temperature is raised and from which the water is directed to the desired location of reuse via a conduit 151 leading from the heating means. As shown schematically in FIG. 3, the heating means 150 comprises a steam generator that is commonly used for the production of hot water or steam. In the alternative, by operating the valve 145 the pressurized water may be discharged through a conduit 152 leading from the valve 145 and directly to the area in which the water is to be reused.

As shown in FIG. 1, the area in which the water is reused may be within the vicinity of the sump 11 as when the water is recycled to again be used for flushing oil and grease from the work area and equipment within the service facility 14. The sump 11 will thus again serve for collectively receiving the water as waste water, and the water is recycled through the oil-water separator 10 to be reprocessed.

Since the waste water may be lost through evaporation or leakage from the oil-water separator 10, or the supply of separated water in the compartment 13b may become substantially exhausted by its being recycled or otherwise reused, there is also included a fresh water supply 160 which introduces fresh water into the oil-water separator 10. The fresh water supply 160, which comprises a source of clean or purified water, is interconnected to the water storage compartment 13b by a conduit means or conduit 161 through which the fresh water is admitted to the water storage compartment. In the event the level of water within the water storage compartment 13b drops to a predetermined relatively lower level, control means operatively associated with the conduit 161 from the fresh water supply 160 operates to admit fresh water into the water storage compartment. The control means includes a valve 162 which is interposed in the conduit 161 from the fresh water supply 160 and which is movable from a normally closed position to an open position. Associated with the valve 162 is water level sensing means comprising a flotation switch 163 that is positioned within a lower portion of the water storage compartment 13b. When the flotation switch 163 senses a predetermined low level of water in the water storage compartment 13b, the flotation switch causes the valve 162 to move from the normally closed position to the open position thereby admitting fresh water into the water storage compartment. When the level of water in the water storage compartment reaches a predetermined high level, the flotation switch 163 senses the level of water and moves the valve 162 to its closed position.

In this manner, the level of water within the water storage compartment 13b is regulated so as to be above the inlet of the submergible pump 140. Thus, if an insufficient amount of water is being processed by the oil-water separator 10, additional fresh water will be supplied so that the submergible pump 140 will not draw air during operation. In an alternative arrangement, not shown, a flotation switch may be operatively associated with the submergible pump 140 for discontinuing its operation in the event that the water level within the water storage compartment 13b drops to a level below the inlet of the pump.

From the foregoing description, it can be seen that the present invention provides an oil-water separator of the type as disclosed and claimed in my said copending parent application with means, including the submergible pump 140, for directing separated water from the water storage compartment 13b for recycling or otherwise reusing the separated water, and wherein the submergible pump 140 is located so as to be submerged in the water in the storage compartment 13b. Further, it can be seen that the pressure tank 141 is so associated with the submergible pump 140 as to obtain a pressurized flow of water from the storage compartment 13b through conduit means 143 and one or the other of the discharge conduits 151, 152 for directing the pressurized water to a desired location for reuse.

It also can be seen that, if desired, the water being pumped from the water storage compartment 13b may be selectively heated by the closing of valve 145 and the opening of valve 146, whereupon the water will be directed through the heating means 150 as it flows to the discharge conduit 151. In the alternative, it is apparent that valves 145, 146 may be respectively opened and closed so the water will bypass the heating means 150 in its course from the water storage compartment 13b to the discharge conduit 152. It is to be noted that the pump means 135 is positioned in the water storage compartment 13b in such a manner as to effect circulation and agitation to the water therein for aerating the same to thereby reduce stagnation and prevent freezing of the water in the water storage compartment 13b. Additionally, it can be seen that the valve means 162, being controlled by the flotation switch 163, is operable to admit fresh water from the fresh water supply 160 into the water storage compartment in the event the level of the water therein drops to a predetermined lower level.

In the drawings and specification, there has been set forth a preferred embodiment of the invention, and although specific terms are employed, they are used in a generic and descriptive sense only and not for purposes of limitation.

That which is claimed is:

1. In an oil-water separator for removing oil and other similar contaminants from waste water, wherein there is provided means defining sequentially arranged first and second oil-water separation compartments for receiving waste water containing oil and other similar lighter-than-water contaminants, conduit means communicatively connecting a lower region of said first oil-water separation compartment to said second oil-water separation compartment and restricting the flow of water from said first to said second oil-water separation compartment so as to increase the residence time of the water within said first separation compartment, means including a drain associated with each oil-water separation compartment for removing separated oil from the surface of the water, said drain associated with said first separation compartment having its mouth located so as to be adjacent but above the surface of the water when said first separation compartment is substantially filled with water and said drain associated with said second separation compartment having its mouth located below the level of the mouth of the drain associated with said first separation compartment, water discharge means, including an inlet end within said second oil-water separation compartment, for discontinuously removing water therefrom at a location below the level of the drain therein, and water level sensing means operably associated with said water discharge means for periodically actuating the same in response to sensing the height of water in said second oil-water separation compartment being at the mouth of the drain therein and for in turn causing the water discharge means to draw the water down to a predetermined lower level below the mouth of the drain, the combination therewith of water collection means connected to said water discharge means for receiving the water therefrom and including a water storage compartment, and means associated with said water storage compartment for directing the water therefrom for reusing the same and comprising a submergible pump positioned in said water storage compartment and being located so as to be submerged in the water therein, means associated with said submergible pump for obtaining a pressurized flow of water, and conduit means associated with said submergible pump for directing the pressurized water to a desired location for reuse.

2. An oil-water separator according to claim 1, wherein heating means are interposed in said conduit means associated with said submergible pump for heating the water pumped from said water storage compartment.

3. An oil-water separator according to claim 1 wherein means are interposed in said conduit means associated with said submergible pump for selectively either heating the water or permitting its use without being heated, said interposed means comprising means for heating the water and valve means for selectively directing the water into said heating means or in bypass relation thereto.

4. An oil-water separator according to claim 1, 2 or 3 including fresh water supply means, conduit means connecting said fresh water supply means to said water storage compartment for the introduction of fresh water therein and control means operatively associated with said fresh water supply conduit means for admitting fresh water into said water storage compartment in the event the level of water therein drops to a predetermined lower level, said control means including valve means interposed in said fresh water supply conduit means and being movable from a normally closed position to an opened position, and water level sensing means positioned within said water storage compartment and being operably associated with said valve means for moving the same from the normally closed position to the opened position upon sensing a predetermined low level of water in the water storage compartment.

5. An oil-water separator according to claim 1, 2 or 3 including pump means positioned within said water storage compartment for effecting a circulation of the water therein and for aerating the same to thereby reduce stagnation and prevent freezing of the water therein.

6. In an oil-water separator for removing oil and other similar contaminants from waste water, wherein there is provided means defining sequentially arranged first and second oil-water separation compartments for receiving waste water containing oil and other similar lighter-than-water contaminants, conduit means communicatively connecting a lower region of said first oil-water separation compartment to said second oil-water separation compartment and restricting the flow of water from said first to said second oil-water separation compartment so as to increase the residence time of the water within said first separation compartment, means including a drain associated with each oil-water separation compartment for removing separated oil from the surface of the water, said drain associated with said first separation compartment having its mouth located so as to be adjacent but above the surface of the water when said first separation compartment is substantially filled with water and said drain associated with said second separation compartment having its mouth located below the level of the mouth of the drain associated with said first separation compartment, water discharge means, including an inlet end within said second oil-water separation compartment, for discontinuously removing water therefrom at a location below the level of the drain therein, and water level sensing means operably associated with said water discharge means for periodically actuating the same in response to sensing the height of water in said second oil-water separation compartment being at the mouth of the drain therein and for in turn causing the water discharge means to draw the water down to a predetermined lower level below the mouth of the drain, the combination therewith of water collection means connected to said water discharge means for receiving the water therefrom and including a water storage compartment, means associated with said water storage compartment for directing the water therefrom for reusing the same and comprising a submergible pump positioned in said water storage compartment and being located so as to be submerged in the water therein, means associated with said submergible pump for obtaining a pressurized flow of water, and conduit means associated with said submergible pump for directing the pressurized water to a desired location for reuse, fresh water supply means, conduit means connecting said fresh water supply means to said water storage compartment for the introduction of fresh water therein, control means operatively associated with said fresh water supply conduit means for admitting fresh water into said water storage compartment in the event the level of water therein drops to a predetermined lower level, said control means including valve means interposed in said fresh water supply conduit means and being movable from a normally closed position to an opened position, and water level sensing means positioned within said water storage compartment and being operably associated with said valve means for moving the same from the normally closed position to the opened position upon sensing a predetermined low level of water in the water storage compartment, and pump means positioned within said water storage compartment for effecting a circulation of the water therein and for aerating the same to thereby reduce stagnation and prevent freezing of the water therein.

7. In an oil-water separator for removing oil and other similar contaminants from waste water, wherein there is provided, means defining a sump for receiving waste water containing oil and other similar lighter-than-water contaminants, means defining sequentially arranged first and second oil-water separation compartments for receiving waste water from said sump, waste water discharge means associated with said sump for removing the waste water therefrom and directing the waste water into said first oil-water separation compartment, conduit means communicatively connecting a lower region of said first oil-water separation compartment to said second oil-water separation compartment and restricting the flow of water from said first to said second oil-water separation compartment so as to increase the residence time of the water within said first separation compartment, means including a drain associated with each oil-water separation compartment for removing separated oil from the surface of the water, said drain associated with said first separation compartment having its mouth located so as to be adjacent but above the surface of the water when said first separation compartment is substantially filled with water and said drain associated with said second separation compartment having its mouth located below the level of the mouth of the drain associated with said first separation compartment, water discharge means, including an inlet end within said second oil-water separation compartment, for discontinuously removing water therefrom at a location below the level of the drain therein, and water level sensing means operably associated with said water discharge means for periodically actuating the same in response to sensing the height of water in said second oil-water separation compartment being at the mouth of the drain therein and for in turn causing the water discharge means to draw the water down to a predetermined lower level below the mouth of the drain, the combination therewith of water collection means connected to said water discharge means for receiving the water therefrom and including a water storage compartment, and means associated with said water storage compartment for directing the water therefrom for recycling the same and comprising a submergible pump positioned in said water storage compartment and being located so as to to be submerged in the water therein, means associated with said submergible pump for obtaining a pressurized flow of water, and conduit means associated with said submergible pump for directing the pressurized water to said sump so that said sump will again serve for collectively receiving the recycled water as waste water.

8. An oil-water separator according to claim 7 wherein heating means are interposed in said conduit means associated with said submergible pump for heating the water pumped from said water storage compartment.

9. An oil-water separator according to claim 7 wherein means are interposed in said conduit means associated with said submergible pump for selectively either heating the water or permitting its use without being heated, said interposed means comprising means for heating the water and valve means for selectively directing the water into said heating means or in bypass relation thereto.

10. An oil-water separator according to claim 7, 8 or 9 including fresh water supply means, conduit means connecting said fresh water supply means to said water storage compartment for the introduction of fresh water therein and control means operatively associated with said fresh water supply conduit means for admitting fresh water into said water storage compartment in the event the level of water therein drops to a predetermined lower level, said control means including valve means interposed in said fresh water supply conduit means and being movable from a normally closed position to an opened position, and water level sensing means positioned within said water storage compartment and being operably associated with said valve means for moving the same from the normally closed position to the opened position upon sensing a predetermined low level of water in the water storage compartment.

11. An oil-water separator according to claim 7, 8 or 9 including pump means positioned within said water storage compartment for effecting a circulation of the water therein and for aerating the same to thereby reduce stagnation and prevent freezing of the water therein.

* * * * *